United States Patent
R

(10) Patent No.: US 8,519,842 B2
(45) Date of Patent: Aug. 27, 2013

(54) REST AND RSS ENABLED ACCESS CONTROL PANEL

(75) Inventor: Aneesh Kumar R, Bangalore (IN)

(73) Assignee: Honeywell International Inc., Morristown, NJ (US)

(*) Notice: Subject to any disclaimer, the term of this patent is extended or adjusted under 35 U.S.C. 154(b) by 460 days.

(21) Appl. No.: 12/904,651

(22) Filed: Oct. 14, 2010

(65) Prior Publication Data

US 2012/0092153 A1   Apr. 19, 2012

(51) Int. Cl.
*G08B 1/00* (2006.01)

(52) U.S. Cl.
USPC .......... 340/531; 340/572.1; 340/539.1; 340/506; 340/539.11; 340/3.1; 701/469

(58) Field of Classification Search
USPC .......... 340/572.1, 539.1, 506, 3.1; 701/469
See application file for complete search history.

(56) References Cited

U.S. PATENT DOCUMENTS

| | | | |
|---|---|---|---|
| 2006/0282886 A1* | 12/2006 | Gaug | 726/5 |
| 2007/0236343 A1 | 10/2007 | Becksted et al. | |
| 2007/0290830 A1 | 12/2007 | Gurley | |
| 2008/0167896 A1* | 7/2008 | Fast et al. | 705/1 |
| 2009/0243852 A1 | 10/2009 | Haupt et al. | |

FOREIGN PATENT DOCUMENTS

| | | |
|---|---|---|
| GB | 2 325 548 A | 11/1998 |
| GB | 2 357 387 A | 6/2001 |
| GB | 2 377 068 A | 12/2002 |
| GB | 2 409 320 A | 6/2005 |
| KR | 10-0735972 | 7/2007 |
| WO | WO 02/01531 A1 | 1/2002 |

OTHER PUBLICATIONS

Great Britain's Intellectual Property Office's Search Report under Section 17 corresponding to Application No. GB1117632.8, dated Jan. 26, 2012.

Great Britain's Intellectual Property Office's Combined Search and Examination Report under Sections 17 & 18(3) corresponding to Application No. GB1117632.8 dated Jan. 27, 2012.

* cited by examiner

*Primary Examiner* — Daryl Pope

(74) *Attorney, Agent, or Firm* — Husch Blackwell

(57) ABSTRACT

A method and apparatus are provided for operating a security system. The method includes providing a security system having at least one sensor, coupling a detected state of the at least one sensor to a web server, the web server publishing the detected state and a remotely located user subscribing to receive the detected state of the at least one sensor via the publication by the web server.

20 Claims, 1 Drawing Sheet

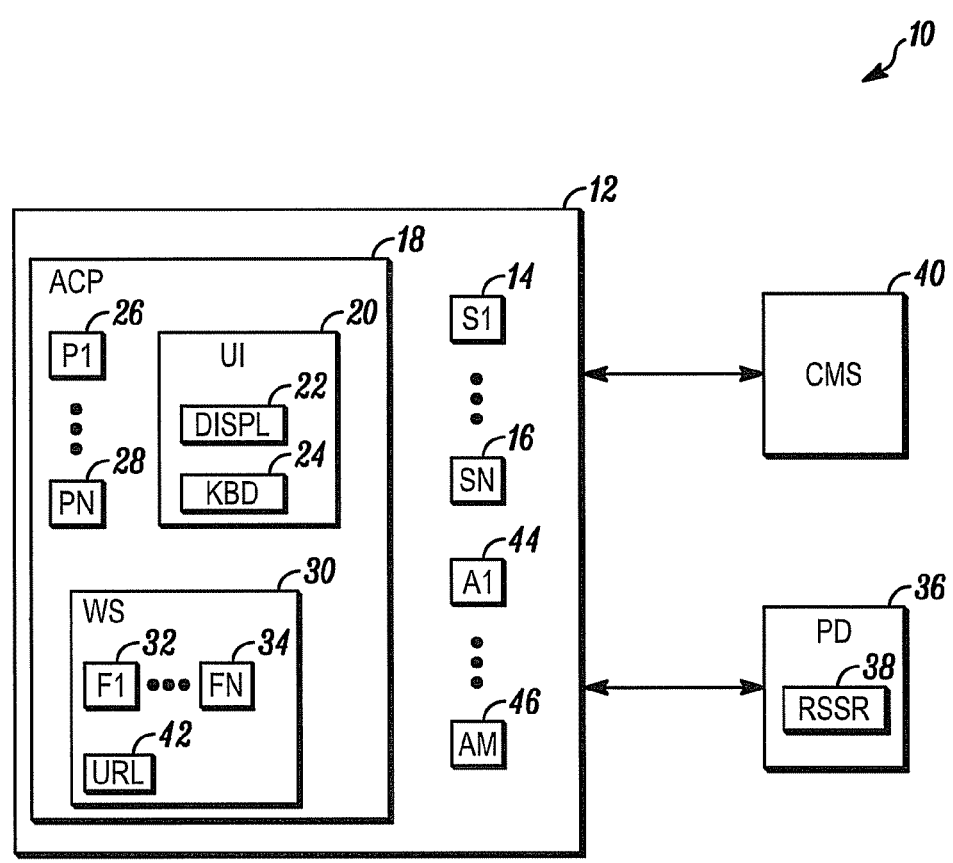

REST AND RSS ENABLED ACCESS CONTROL PANEL

FIELD OF THE INVENTION

The field of the invention relates to security systems and more particularly to the control of security systems.

BACKGROUND OF THE INVENTION

Security systems are generally known. Such systems typically include a physical barrier (e.g., walls, doors, etc.) that define and protect a secured area and number of sensors placed around a periphery or within the secured area for the detection of intruders. The sensors may include one or more switches placed on doors or windows. The sensors may also include passive infrared (PIR) detectors and/or motion detectors.

The sensors of a security system are typically connected to an access control panel. The control panel may be armed or disarmed by an occupant through a user interface on the control panel.

The control panel may typically be armed in one of two modes. In a first alarm away mode, the control panel may monitor all sensors for intruders. In a second alarm stay mode, the control panel may only monitor sensors on a periphery of the protected space with interior sensors deactivated.

Once armed, the control panel may monitor the appropriate set of sensors based upon the mode. Upon activation of an intrusion detection sensor, the control panel may activate a local alarm and/or send an alarm signal to a central monitoring station.

While such systems work well, they are difficult to adapt to different reporting requirements. For example, security systems for small areas are typically structured to generate an alarm if any monitored sensor is activated. Often the alarm is only reported locally. In the event that one monitored sensor is to be given a higher priority and is to be reported to a central monitoring station, the panel must be reprogrammed. Accordingly, a need exists for move flexible methods of adapting alarm systems to varying reporting requirements.

BRIEF DESCRIPTION OF THE DRAWING

FIG. 1 depicts an alarm system in accordance with an illustrated embodiment of the invention.

DETAILED DESCRIPTION OF AN ILLUSTRATED EMBODIMENT

FIG. 1 depicts a security system 10 used to protect a secured area 12 shown generally in accordance with an illustrated embodiment of the invention. Included within the security system 10 may be a number of sensors 14, 16 and an access control panel 18.

The firmware of the panel 18 may be provided in such a way that the status of the panel 18 and sensors can be published to a predetermined number of authorized outside users under a hyper text transfer protocol (http). The status of sensors can also be exposed to inquiries through the Internet using a Representational State Transfer (REST) protocol so that any authorized outside user can enter the appropriate universal resource locator (URL) and obtain status information using a conventional web browser. The use of the REST protocol avoids the requirement for host software within the panel 18 in cases where the functionality of the control panel 18 must be altered and where it becomes necessary to provide the status of the panel 18 and individual sensors to outside users.

A Rich Site Summary (RSS) mechanism may be provided to allow authorized outside users to subscribe to status information from the system 10 that is, in turn, pushed as an RSS feed to an RSS reader of the outside user. The RSS reader can be web based, desktop based or mobile device based. Since the RSS feed is an XML structure, it allows for the seamless integration of existing alarm panels 18 with changing reporting needs.

Turning now to the system 10, in general, a user interface 20 may be included within or located near the control panel 18. The user interface 20 may include a keyboard 24 for entry of control commands and a display 22 that displays status information. In this case, an authorized user may enter a personal identification number (PIN) and an alarm away or alarm stay pushbutton to arm the system 10.

Also included within the control panel 18 is a number of processors 26, 28 that process alarm events. For example, an alarm processor 26, 28 may monitor the sensors 14, 16 for activation in the armed away or armed stay modes.

Included within the control panel 18 may be a web server processor 30 that provides the functionality of a web site. The web server 30 may operate under the REST format.

Included within the web server processor 30 may be one or more http documents (under the REST format) within files 32, 34. Each of the documents/files includes status information for the panel 18 or for at least one of the sensors 14, 16 in an appropriate format (e.g., XML).

During normal operation the alarm processor 26, 28 monitors the status of the panel 18 and sensors 14, 16 and writes status changes into one or more of the files 32, 34. A publication processor 26, 28 operating under the RSS format detects any changes to the files 32, 34 and publishes the respective http documents.

At least some of the files 32, 34 may be structured to receive commands (actions) from authorized outside users. In this case, a command processor 26, 28 may monitor the files 32, 34 for changes from outside parties and execute those commands within the control panel 18.

During set up of the system 10, a RSS reader 38 is provided within a destination device of each authorized outside user. The destination device in this case could be a portable device (e.g., cell phone, iphone, Blackberry, etc.) 36 of the outside user. The destination device could also be a central monitoring station 40.

As part of the set up process, a set up technician may use the RSS reader 38 to subscribe to receive notification of changes to one or more of the http documents within files 32, 34. In this case, each time the alarm processor 26, 28 writes a change into one of the files 32, 34, notification of the change and/or the http document within the file 32, 34 may be sent to the authorized outside user 36, 40.

Alternatively, the outside user 36, 40 may enter the URL 42 of the http document 32, 34 that the outside user 36, 40 wishes to review through a web browser of the device 36, 40. In response, the web server 30 responds with the http document including the requested status indicator.

In general, subscription and access to http documents 32, 34 is determined during set up of the alarm system 10. Access to the web server 30 is limited to the authorized outside users identified during set up of the system 10.

As a specific example, the system 10 may have access control infrastructure for 3 doors (door #1, door #2 and door #3). Doors #1 and #2 provide access into less secured areas and door #3 is a high security area. As such, security personnel may be interested in monitoring the real time alarms and status of only door #3.

In order to monitor only door #3 in a system originally designed to monitor all 3 doors, a host application would have had to be installed within the secured area 12 to communicate with the control panel 18. A user interface application would also have been needed to monitor the status events within the control panel 18 and report those events to authorized users.

In the past, it has been difficult to integrate outside access into existing security systems. This difficulty has existed because of the proprietary protocols used in existing alarm panels or because of the non-open nature of the application program interfaces (APIs) of the host applications.

Continuing with the above example, assume that the URL address of the web server 30 is "http://panelService/." Assume further that the URL of the devices (door #1, door #2 and door #3) is "http://panelService/devices, the event URL for retrieving status information regarding changes in status is "http://panelService/events" and the action URL for sending commands to the system 10 is "http://panelService/actions." It will be assumed that door #1 has a device identifier (ID) of "DEV1", door #2 has a device ID of "DEV2" and door #3 has an ID of "DEV3."

Since the status of the devices is exposed using the REST enabled web server 30 through the URL "http://panelService/devices", the status of door #1 can be obtained by entry of the URL "http://panelService/devices/devId=DEV1" through any web browser or from a small application using the HTTP request/response APIs provided through most programming languages. Similarly, the status of door #2 can be obtained by entry of the URL "http://panelService/devices/devId=DEV2" and the status of door #3 can be obtained by entry of the URL "http://panelService/devices/devId=DEV3."

Now assume that a valid card swipe through a sensor 14, 16 has an event code of "200", an invalid card swipe has an event code of "201" and the case of an access door being held open has an access code of "202." In the case of the panel 18 having RSS support (as described above), outside users (clients) can subscribe to event changes via the URL "http://panelService/events." In this case, the occurrence of events are detected by the publication processor 26, 28 and published to authorized users 36, 40. Event details will be understood by the subscribing user 36, 40 because event details are published along with the event code. If the published event's code is "200", then the client of the authorized user 36, 40 can interpret the event as a "Valid Card Swipe" and display text indicating this event along with the indicator "door #3."

Actions to be executed by the system 10 can also be accomplished through a web browser of authorized users 36, 40 or a third party HTTP application via the URL "http://panelService/actions" with the appropriate parameter. For example, to shunt the sensor on door #1, the user may enter the URL/command "http://panelService/actions/devId=DEV1|Action=SHUNT." In this case, the REST format provides the necessary features for parsing this request/command and taking the appropriate action.

In general, virtually any third party application can be used by an authorized user to communicate with the panel 18 to request information and execute commands using the standards provided by HTTP, REST and RSS. This approach enables the system 10 to be seamlessly integrated with changing reporting requirements.

A specific embodiment of method and apparatus for provide remote access has been described for the purpose of illustrating the manner in which the invention is made and used. It should be understood that the implementation of other variations and modifications of the invention and its various aspects will be apparent to one skilled in the art, and that the invention is not limited by the specific embodiments described. Therefore, it is contemplated to cover the present invention and any and all modifications, variations, or equivalents that fall within the true spirit and scope of the basic underlying principles disclosed and claimed herein.

The invention claimed is:

1. A method comprising:
providing a security system that protects a secured area, the security system having at least one sensor and an access control panel;
an alarm processor of the access control panel monitoring the at least one sensor for activation and writing any changes in a state of the at least one sensor into a status file of the at least one sensor;
a web site processor of the access control panel providing the functionality of a web site monitoring for and detecting any changes in the status file of the at least one sensor;
a remotely located user subscribing to receive the detected state of the at least one sensor; and
the web site processor publishing notification of the detected change by pushing notification of the detected change to the subscribing remotely located user.

2. The method of claim 1 further comprising operating the web site under a representational state transfer (REST) format.

3. The method of claim 1 further comprising publishing the state under a rich site summary (RSS) format.

4. The method of claim 1 further comprising the alarm processor within the alarm panel that monitors the at least one sensor transferring any state changes to the web server.

5. The method of claim 4 further comprising the alarm processor writing the state changes into a web page of the web server.

6. The method of claim 5 further comprising the web server detecting the changes to the web page and publishing the change to the user.

7. Apparatus comprising:
a security system having at least one sensor;
a web server operating under a REST format;
a plurality of http documents, each saved in a respective file identified by a URL associated with the web server;
an alarm processor that couples a detected state of the at least one sensor into a least one of the http documents of the web server wherein the web server monitors for and detects any changes in the at least one of the http documents and, in response, publishes the detected state; and
a remotely located user that subscribes to receive the detected state of the at least one sensor and receives the detected state of the at least one sensor via a notification pushed to the subscribing remotely located user by the web server.

8. The apparatus of claim 7 wherein at least one of the plurality of http documents receives commands from the remotely located user.

9. The apparatus of claim 8 wherein the security system executes the received commands from the remotely located user.

10. The apparatus of claim 7 further comprising publishing the state under a rich site summary (RSS) format.

11. The apparatus of claim 7 further comprising providing a publication processor within the alarm panel that monitors an http document of the plurality of http documents for changes and publishes the document in response to the change.

12. The apparatus of claim 10 further comprising the alarm processor writing the state changes into a web page of the web server.

13. Apparatus comprising:
   a security system having at least one sensor that detects entry into a secured area;
   a web server operating under a REST format;
   at least one http document containing a state of the at least one sensor;
   an alarm processor of the security system that monitors the at least one sensor for activation and writes any changes in a state of the at least one sensor into the at least one http document, wherein the web server monitors for and detects any changes to the at least one http document and where the at least one http document is published by the web server in response to a change in the state of the sensor; and
   a remotely located user that subscribes to receive the detected state of the at least one sensor and receives the detected state of the at least one sensor via a notification pushed to the remotely located user from the web server.

14. The apparatus of claim 13 further comprising an alarm processor that couples a detected state of the at least one sensor into the http documents of the web server.

15. The apparatus of claim 13 further comprising a plurality of http documents where at least one of the plurality of http documents receives commands from the remotely located user.

16. The apparatus of claim 13 wherein the security system executes the received commands from the remotely located user.

17. The apparatus of claim 13 further comprising publishing the state under a rich site summary (RSS) format.

18. The apparatus of claim 13 further comprising providing a publication processor within the alarm panel that monitors the http document for event changes and publishes the document in response to the change.

19. The apparatus of claim 17 further comprising the alarm processor writing the state changes into a web page of the web server.

20. The apparatus of claim 17 further comprising the remotely located user downloads a state of the at least one sensor via a predetermined URL.

* * * * *